United States Patent [19]

De Jong

[11] Patent Number: 4,513,687
[45] Date of Patent: Apr. 30, 1985

[54] METHOD AND APPARATUS FOR FEEDING LIVESTOCK

[76] Inventor: Walter J. De Jong, 23430 High Bridge Rd., Monroe, Wash. 98272

[21] Appl. No.: 575,518

[22] Filed: Jan. 31, 1984

[51] Int. Cl.³ .......................... A01K 5/02; A01K 1/12
[52] U.S. Cl. .................................. 119/27; 119/14.03; 119/63
[58] Field of Search ............ 119/27, 14.03, 63, 51.11, 119/53, 51 R

[56] References Cited

U.S. PATENT DOCUMENTS

| | | | |
|---|---|---|---|
| 2,779,309 | 1/1957 | Myer et al. | 119/27 |
| 3,124,104 | 3/1964 | Carpenter | 119/63 X |
| 3,144,173 | 8/1964 | France et al. | 119/51.11 X |
| 3,157,157 | 11/1964 | Clay et al. | 119/51.11 |
| 3,230,933 | 1/1966 | Myers et al. | 119/53 |
| 3,359,947 | 12/1967 | Biehl | 119/63 X |
| 3,699,922 | 10/1972 | Holm | 119/14.03 |
| 3,805,742 | 4/1974 | Shulick et al. | 119/27 |

Primary Examiner—Hugh R. Chamblee
Attorney, Agent, or Firm—Seed and Berry

[57] ABSTRACT

A feeding apparatus comprises a manger having a plurality of control gates which require sequential entry into feeding stalls. An adjustable feed mechanism makes a predetermined amount of feed available to each animal and requires the animal to eat the feed before its entire portion will be dispensed. When feeding is complete, the manger is moved to deny the animals further access to the feed. Preferred embodiments include an elevated splash guard for improved sanitation.

4 Claims, 7 Drawing Figures

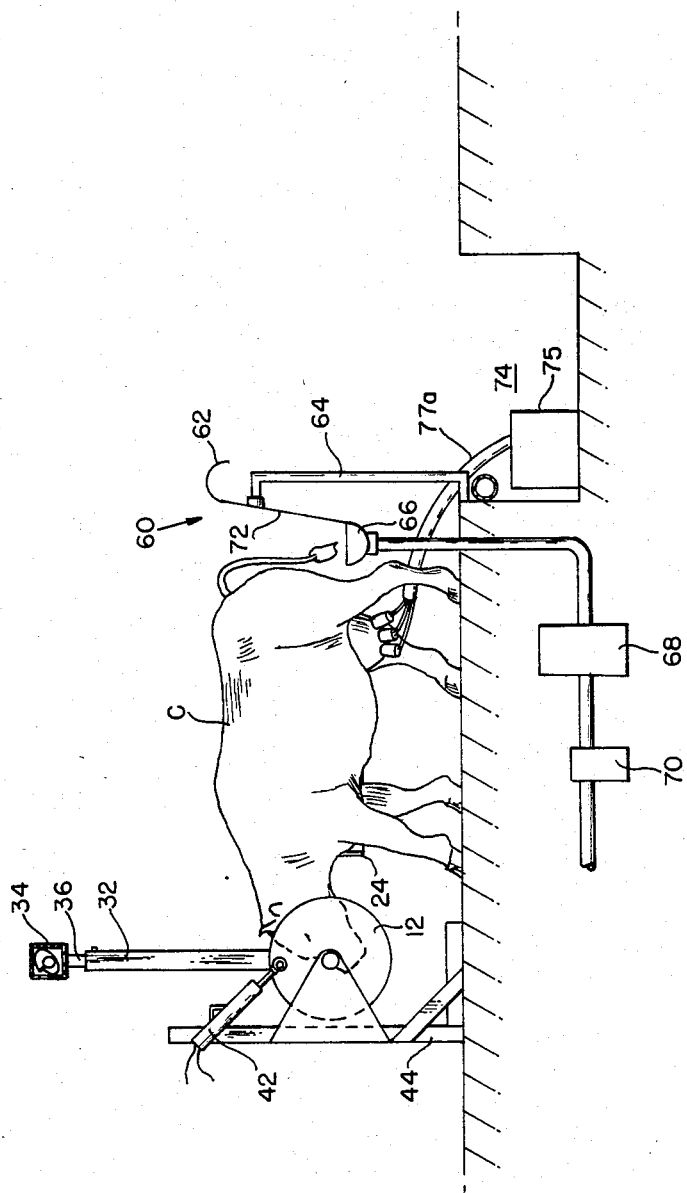

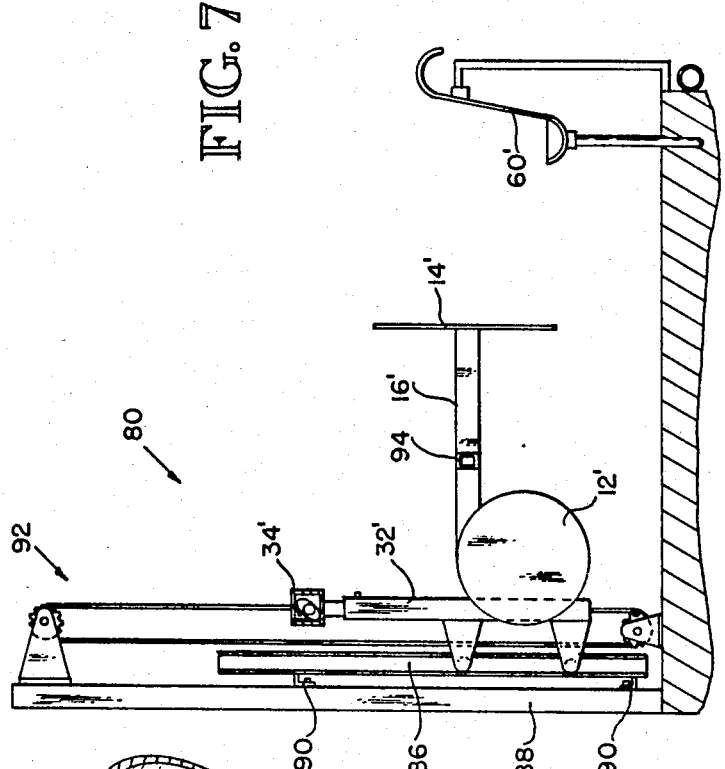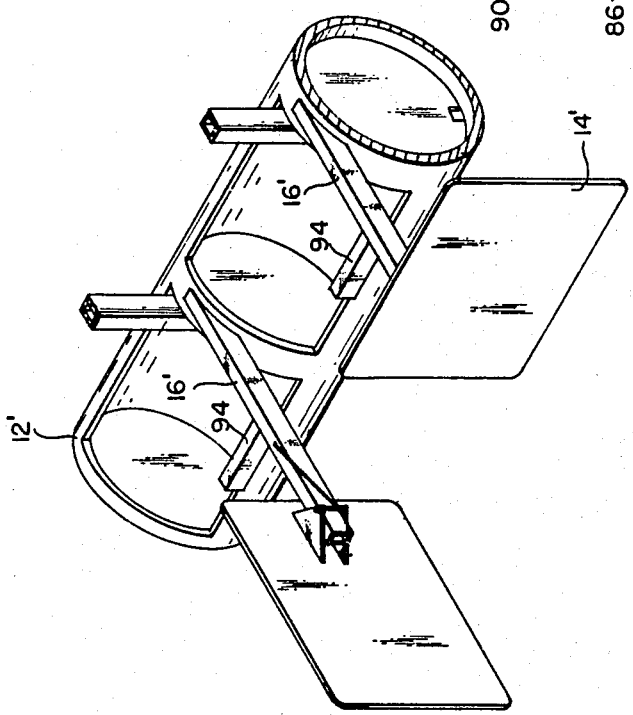

METHOD AND APPARATUS FOR FEEDING LIVESTOCK

DESCRIPTION

1. Technical Field

This invention relates to a method and apparatus for feeding livestock, and more particularly, to an improved method and apparatus suitable for feeding and milking dairy animals which includes in a preferred embodiment an improved system for removing animal waste from the feeding and milking environment.

2. Background Art

Dairy cattle are normally fed grain during milking. As the cattle must be confined for both milking and feeding, it is efficient to combine the two operations. Furthermore, as cows like to eat grain, it is much easier to get the cows to come in for milking if they are fed grain while they are milked.

It is desirable to feed dairy cows an equal ration of grain each day. The size of this grain ration is based on such factors as the availability of other food and the preferences of the particular farmer feeding the animals. Most dairy farmers, for example, prefer to feed each cow a daily grain ration somewhere in the range of 14–28 pounds.

In a conventional milking and feeding operation, a group of dairy cows is led into a series of milking stalls adjacent a feeding manger. A premeasured amount of grain is dumped into the manger adjacent each stall for consumption by the cows during milking. A separate milking machine is provided for each stall so that all cows may be simultaneously milked as they are consuming their ration of grain. When the last cow is done milking, the whole group of cows is led out of the milking area. The milking and feeding operation is then repeated for a new group of cows which are led into the stalls. This procedure is repeated until all cows have been milked and fed.

It can be seen, then, that the efficiency of such an operation will be determined by the ease with which the cows can be led into the feeding stalls, fed, milked, and removed from the feeding stalls. It is desirable to provide a method and apparatus which will maximize the efficiency as well as provide the other characteristics desired in such an operation.

The sanitary needs of a conventional feeding and milking operation are met by providing a floor-level trough positioned behind the cows in the milking stalls to transport waste material produced by defecation or urination out of the milking and feeding area.

Although conventional feeding and milking operations allow cows to be fed and milked at the same time, there are several drawbacks to such conventional operations. Conventional feeding operations can not truly provide an equal ration of food to all animals. In the system described above, for example, if one cow in the first group does not consume its entire ration of grain by the time milking is complete, the uneaten grain will remain in the manger. When a cow from the second group arrives in the same stall for milking and feeding, a new ration of grain will be dumped into the manger at the same location. The second cow will thus receive its own ration of grain, plus the grain uneaten by the previous cow.

Another drawback of the conventional system stems from the fact that cows eat at different rates. Thus, when milking is complete, some cows may not be finished eating the grain. This situation creates a problem because it is difficult to get a cow which has not finished its grain to leave a milking stall. Cows prefer to stay in the stalls until they have eaten all the available grain. These lagging cows cause delays which decrease the efficiency of the total operation.

The conventional feeding and milking operation described above is also relatively inefficient for milking, as it utilizes one milking machine for each cow. Such an arrangement is not time efficient, as too much time is spent moving the cattle into and out of the feeding and milking area. Additionally, as cows require different amounts of time to milk, time is often wasted waiting for a slow milking cow to finish.

Another disadvantage of the conventional milking and feeding operations is that the sanitary system is relatively inadequate. While the floor elevation troughs of a conventional operation provide a means for transporting waste material, the journey of such waste material into the troughs is often somewhat precarious. When a cow defacates, for example, its waste may either miss the trough completely, or produce a splash which will splatter waste material from the trough around the surrounding area. Either of these two occurrences is understandably messy and undesirable, especially from the standpoint of the persons operating the milking equipment in the area. Additionally, time and effort are required to clean up such messes.

It is desirable, then, especially in large dairy or livestock operations, to provide an efficient means for feeding predetermined amounts of grain to animals, and for dairy operations, to have an efficient means for milking dairy animals at the same time. Additionally, an improved means for disposing of waste materials is also desirable.

Although much of the discussion herein relates specifically to dairy operations, it is not intended that the invention be limited to such operations. It will be obvious from the description that follows that the present invention will be useful in non-dairy environments facing problems common to those described herein.

DISCLOSURE OF THE INVENTION

It is an object of this invention to provide a method and apparatus for efficiently feeding grain to livestock.

It is another object of this invention to provide such a method and apparatus which will enable a predetermined amount of grain to be given to each animal.

It is a further object of this invention to provide such a method and apparatus which is well suited for feeding dairy animals during milking.

It is another object of this invention to provide an apparatus for efficiently removing animal waste from a milking or feeding environment.

It is another object of this invention to provide an efficient method for milking dairy animals.

These and other objects which will become more apparent as the invention is more fully described below are obtained by providing an improved method and apparatus for feeding livestock, especially dairy cattle. Animals are led into a feeding and milking area containing an improved feeding apparatus. In preferred embodiments, the feeding apparatus comprising a manger having a plurality of stalls extending outwardly therefrom. A plurality of control gates require sequential entry into the stalls which are partially defined by the gates as they open. An adjustable feed mechanism makes a predetermined amount of feed available to each animal and requires the animal to eat the feed before its entire portion will be dispensed, thereby eliminating the overfeeding problems of conventional systems.

Upon completion of feeding, the livestock are denied access to grain within the manger, thereby removing the incentive of slow eating animals to remain at the manger. In a first preferred embodiment illustrated herein, the manger is rotated to deny the cattle access to the grain. An alternate embodiment elevates the manger to accomplish the same function.

Preferred embodiments of the invention also include an elevated splash guard to reduce splashing and spilling of animal wastes for improved sanitation.

In preferred embodiments for milking dairy animals, two stalls are provided for each milking machine. This arrangement reduces the amount of time spent moving cows into and out of the feeding and milking area and reduces the wait for slow cows by averaging the milking time over two cows.

BRIEF DESCRIPTION OF THE DRAWINGS

FIG. 5 is a side elevation view of the embodiment of FIG. 1, including the splash guard.

FIG. 6 is an isometric view of a manger, dividing arms and control gates of an alternate preferred embodiment of the invention, cut away to illustrate one end of the manger.

FIG. 7 is a side elevation view of the preferred embodiment of FIG. 6.

BEST MODE FOR CARRYING OUT THE INVENTION

A group of animals are fed using a preferred embodiment of the method of the present invention by leading the group into a feeding area and requiring them to sequentially enter a plurality of feeding stalls adjacent a manger. Once in a stall, each animal is given access to a predetermined amount of grain which is dispensed only upon consumption. When milking as well as feeding is to be accomplished, a milking machine preferably services a plurality of stalls to reduce the time spent transporting the animals into and out of the stalls and average out the milking time of the animals. When milking is complete, the manger is moved to deny the animals further access to the food within the manger. A group of animals may then be easily led out of the feeding and milking area and a second group fed by the same method.

Figure 1:
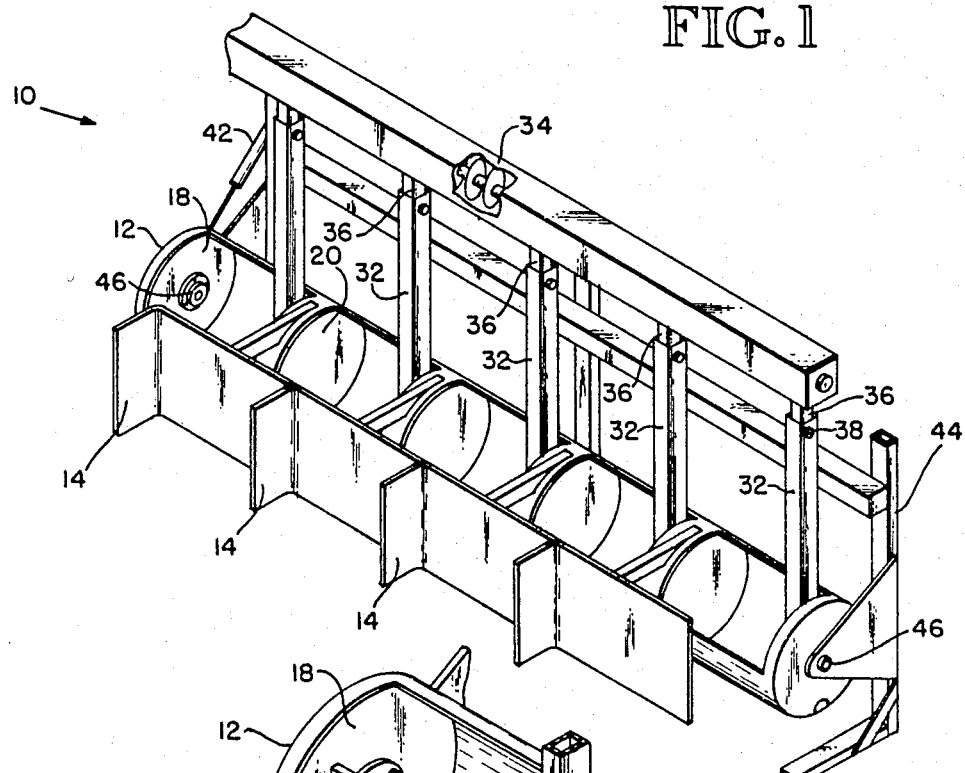
FIG. 1 is an isometric view illustrating a preferred embodiment of the feeding apparatus of this invention.
Figure 2:
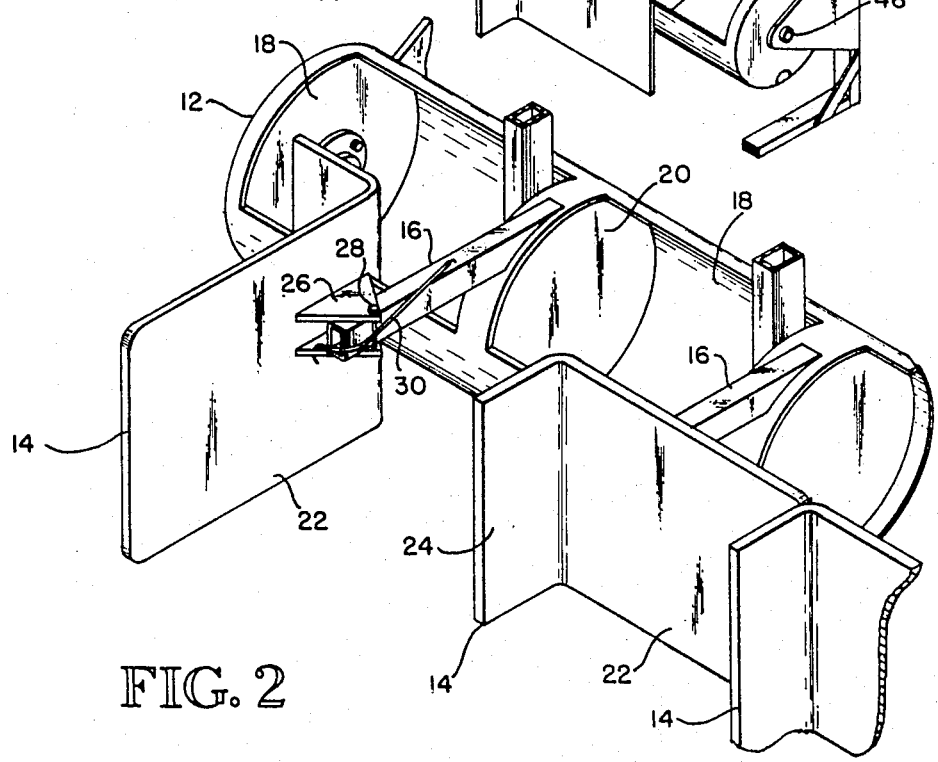
FIG. 2 is an isometric view of the apparatus of FIG. 1 illustrating the operation of the control gates of embodiment illustrated in FIG. 1.

A preferred embodiment 10 of a feeding apparatus in accordance with the present invention is illustrated in FIG. 1. The feeding apparatus includes an elongated manger 12 and a plurality of entry control gates 14 positioned in front of the manger. The control gates are pivotally mounted on dividing arms 16 which extend outwardly from the manger. The gates may pivot from a closed position which blocks entry to the manger (as illustrated in FIG. 1) into an open position which permits access to the manger (as illustrated in FIG. 2). When in an open position, a gate and corresponding dividing arm will form a barrier to define a milking stall.

As can be seen in FIGS. 1 and 2, the manger is divided into a plurality of manger sections which correspond to each milking stall to provide an individual eating area for each stall. The manger sections include an entryway 18 which enables an animal to have access to the interior of the manger. Sidewalls 20 separate the manger sections to prevent an animal in one stall from eating out of an adjacent manger section.

In the preferred embodiment illustrated in FIGS. 1-5, each control gate preferably includes a barrier surface 22 and a pushing surface 24 which projects outwardly therefrom as seen in FIG. 2. When the gates are in a closed position, the barrier surface will block access to the manger. The pushing surface provides a surface which may be easily engaged by an animal and used to pivot the control gate into an open position. Once in an open position, the barrier surface will prevent the animal from moving into an adjacent stall while the pushing surface will restrain the forward motion of the animal. This forward restraint is important because it prevents animals from moving so close to the manger that they can no longer be reached by the milking equipment. Additionally, in preferred embodiments utilizing a splash guard as described below, the pushing surface will ensure that the animal does not move out of the desired position with respect to the splash guard.

Sequential entry into the stalls is required by the entry control gates. As seen in FIG. 1, each entry control gate is mounted on a corresponding dividing arm such that when the gate is closed, it will extend transversely to the left and right of the dividing arm. The gates swing clockwise to open such that the left side of the gate moves forward toward the manger and the right side moves away from the manger, as illustrated in FIG. 2. When a gate is closed, the right side of the gate extends to the right on the corresponding dividing arm to block entry into the stall to the right of the dividing arm. Only when a first animal has entered the stall to the left of the dividing arm and pivoted the gate into an open position may a second animal enter the next stall to the right. Similarly, the entry of the second animal into the right stall will permit access to the next stall down the line. It can be seen then that the gate arrangement requires the animals to fill the stalls sequentially from left to right.

The pivotal connections between the dividing arms and gates in the preferred embodiments illustrated herein are best seen in FIG. 2. Gusset members 26 extend outwardly from the rear face of the barrier surface to support a pinned connection 28 to the dividing arm. A bungie cord 30 or similar elastic device extends from the dividing arm to one of the gussets to bias the control gate into the closed position.

In the preferred embodiments illustrated herein, feed is dispensed into the individual manger sections by adjustable, hollow feed columns. A conventional auger unit 34 extends above the feed columns and discharges feed into the feed columns through discharge columns 36 which depend from the auger unit. The lower end of each discharge column extends into a corresponding feed column and communicates therewith. Bolts 38 extending through the feed column to engage the discharge column and hold it in place. By loosening the bolts, the position of the discharge column relative to the feed column may be varied, thereby increasing the effective height of the feed column. This adjustable features allows the combined height of the feed column and discharge column to determine the amount of feed which can be dispensed into each manger section, and hence defines the size of the feed ration.

Each feed column extends downwardly to the bottom of a manger section. A discharge aperture 32 on one side of the feed column allows an animal within a feeding stall to have access to feed within the column. Unlike a conventional system, however, the feed within the feeding column will be discharged into the manger section only as the cow eats the feed. Consequently, if a cow eats only half its ration, the other half remains in the feed column. When the auger unit is reactivated to provide a new ration for the next cow, the feed column will be filled (although it will only take an additional half ration of grain to do so). The next cow into the manger stall will thus receive only a normal ration, not an oversized ration.

Figure 3:
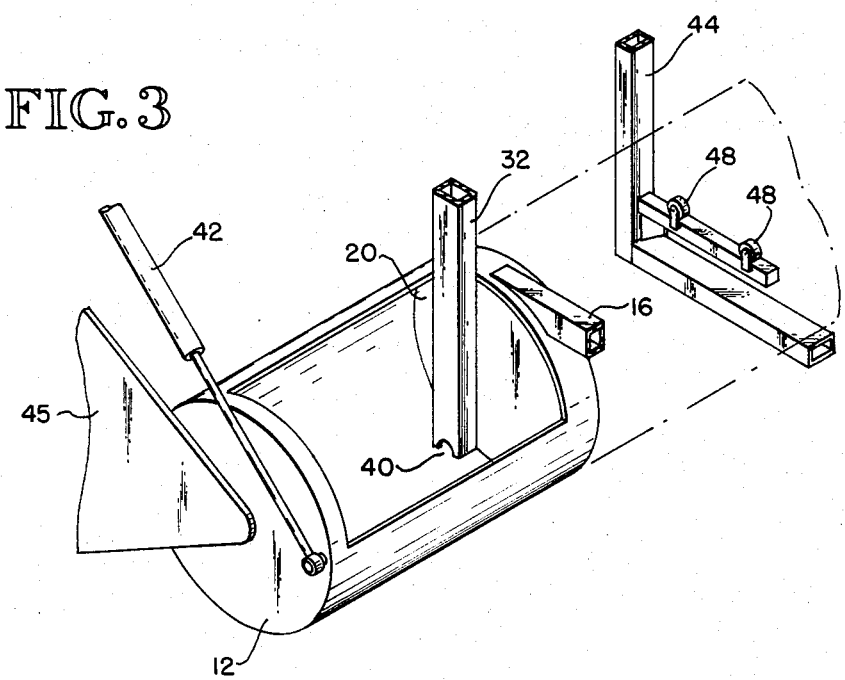
FIG. 3 is an isometric view illustrating the manger of the embodiment illustrated in FIG. 1 in the feed position.
Figure 4:
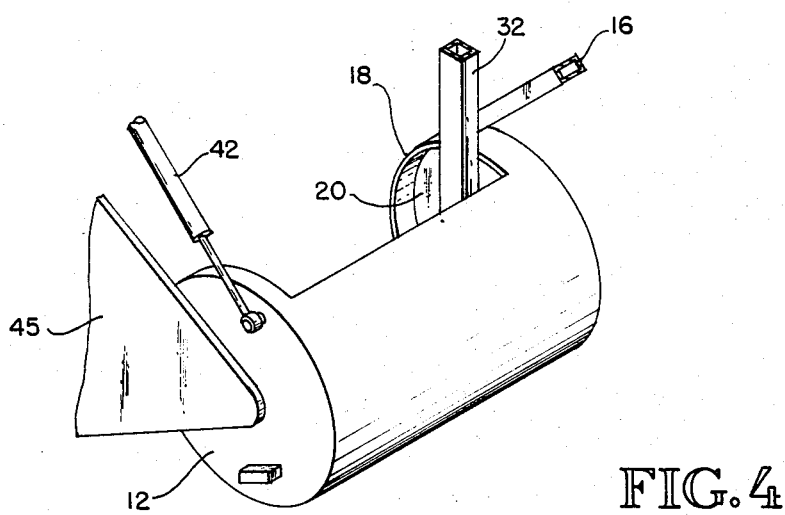
FIG. 4 is an isometric view illustrating the manger of FIG. 3 after it has been rotated to deny animals access to food within the manger.

When it is desired to remove the animals from the feeding area, the manger illustrated in FIGS. 1-5 may be rotated to deny the animals access to the feed by actuating a hydraulic cylinder 42 which is connected to one end of the manger as shown in FIG. 3. The manger is rotatably mounted to the manger frame 44, including angle members 45 on either end thereof and preferably supported intermediately and at the ends by rollers 48 positioned on the manger frame. When the hydraulic cylinder 42 is contracted, it will rotate the manger into the position illustrated in FIG. 4. In this position, the entryway 18 to each manger section is rotated toward the backside of the milking stall so that an animal within the stall will no longer have access to grain within the manager section.

FIG. 5 illustrates the preferred embodiment described above utilizing a splash guard. A cow C is shown within a milking stall. The control gate is in an open position such that the pushing surface 24 restrains forward motion of the cow. A cow is shown with its head extending through the entryway to allow it to consume grain which has been dispensed from the augur unit in 34 into the feed column 32 and into the manger section. At the rear of the milking stall is a splash guard assembly 60 comprising a splash guard 62 and a splash guard support 64. The splash guard comprises an elevated trough portion 66 for receiving waste material and carrying it to a sump 68. A pump 70 allows water to be constantly circulated through the trough to remove wastes which land therein. Rising upwardly from the trough portion of the splash guard is a guard portion 72 which prevents splashes caused by animal defacation to reach persons located in the operator pit 74 below and rearward of the milking station. A milking machine 75 positioned in the pit includes a plurality of lines 77 extending to the cow. The milking machine is positioned within the pit such that the lines will reach cows in adjacent stalls, thereby enabling the machine to be used to milk multiple cows.

An alternate means of denying animals access to food within the manger is provided in the preferred embodiment illustrated in FIG. 7. A manger 12' can be elevated out of the reach of animals by means of a chain-driven cam roller mechanism 80. The manger is mounted to a feed column 32', which includes vertically aligned pairs of gussets 82 and rollers 84 which extend rearwardly therefrom at locations spaced apart along the width of the manger. The rollers of each pair are rollably mounted within a vertical channel 86, which is mounted to a nearby wall 88 by brackets 90. The vertical position of the manger is controlled by a chain drive mechanism 92 which engages the auger 34' and the bottom end of a feed column. A drive motor (not shown) powers the drive mechanism to raise or lower the manger as desired.

The embodiment illustrated in FIG. 7 is desirable in that it eliminates the need for the manger frame shown in FIG. 1. Where suitable support means are provided to eliminate the need for a wall behind the manger, an elevating manger mechanism can be used to allow the animals, once fed, to exit the feeding stations by traveling directly behind the manger. In operations where limited room is available above the feeding manger, the rotating manger illustrated in FIGS. 1-5 will still be preferred.

The embodiment illustrated in FIG. 7 also includes an alternate dividing arm and entry control gate arrangement. Dividing arm 16' extends forwardly from the manger a relatively long distance as compared to the dividing arms in the embodiment illustrated in FIGS. 1-5. The gates 14' are thus positioned relatively close to the splash guard 60'. This embodiment is designed to restrict the space between the gates and splash guard so that two animals cannot pass through the space at the same time. If this space is too large, multiple animals can pass between the gates and splash guard. When one of these animals attempts to enter a stall, the other animal or animals may block the gate and prevent it from swinging open. As the stalls must be opened and filled sequentially, one such blockage will tie up any further filling of the stalls until the animals are unjammed. It is desirable, therefore, to limit the space between the gates and splash guard to a distance less than the width of two animals.

One side effect of extending the dividing arms outwardly toward the splash guard is that the forward end of the gate, when the gate is open, will no longer be close enough to the manger to serve as a forward restraint to prevent the animal from moving too close to the manger. Each dividing arm is thus provided with a forward restraint 94 which projects perpendicularly outward therefrom, as shown in FIG. 6. A plurality of straight gates are employed and connected to the dividing arms in the same manner as in the embodiment of FIG. 2.

While the invention has been described herein with respect to particular embodiments, it is not intended that the invention be limited to these embodiments. Many modifications of these embodiments are possible without departing from the spirit of the invention. It is intended that the invention encompass all embodiments equivalent to those disclosed herein.

I claim:

1. An apparatus for feeding livestock, which comprises:
    an elongated manger including a plurality of longitudinally spaced-apart feeding locations therein;
    means for dispensing feed into the feeding locations;
    a plurality of dividing arms extending forwardly from the manger to define feeding stalls in front of the manger corresponding to the feeding locations;
    a plurality of entry control gates, each entry control gate pivotally mounted on a dividing arm such that when the gate is in a closed position, it will extend longitudinally outward from the dividing arm in a first direction to partially block a first stall adjacent the dividing arm and in a second direction to block entry to a second stall adjacent the dividing arm, the first side of the gate pivoting toward the manger and the second side pivoting away from the manger to move the gate into an open position wherein the gate extends outwardly from the dividing arm in a direction substantially aligned with the dividing arm to further define the first stall and permit entry into the second adjacent stall.

2. The apparatus of claim 1, additionally including means for restricting the forward movement of an animal toward the manger.

3. The apparatus of claim 2 wherein the restricting means comprises a restricting arm which projects longitudinally from the dividing arm.

4. The apparatus of claim 2 wherein the restricting means comprises a pushing surface which projects forwardly from the first end of the gate when the gate is in a closed position and projects longitudinally from the gate when the gate is in an open position.

* * * * *